United States Patent [19]

Angold

[11] 3,725,607

[45] Apr. 3, 1973

[54] MAGNETIC RECORDING APPARATUS WITH EDGE ERASE MEMBERS WHICH ERASE AREA BETWEEN TRACKS

[75] Inventor: Edward Barnabas Angold, Chichester, England

[73] Assignee: International Computers Limited, London, England

[22] Filed: Apr. 23, 1971

[21] Appl. No.: 136,932

[30] Foreign Application Priority Data

May 26, 1970 Great Britain....................25,231/70

[52] U.S. Cl...179/100.2 D, 340/174.1 F, 346/74 MC

[51] Int. Cl.............................G11b 5/02, G11b 5/22

[58] Field of Search................179/100.2 D, 100.2 C; 340/174.1 F, 174.1 G; 346/74 MC

[56] References Cited

UNITED STATES PATENTS

| | | | |
|---|---|---|---|
| 3,132,214 | 5/1964 | Welsh | 179/100.2 C |
| 3,548,113 | 12/1970 | Althuber | 179/100.2 D |
| 3,480,935 | 11/1969 | Springer | 179/100.2 C |
| 3,562,443 | 2/1971 | Bos et al. | 179/100.2 D |
| 2,987,582 | 6/1961 | Naiman | 179/100.2 D |
| 3,155,949 | 11/1964 | Tibbetts | 179/100.2 D |

*Primary Examiner*—Vincent P. Canney
*Assistant Examiner*—Alfred H. Eddleman
*Attorney*—Misegades & Douglas, Keith Misegades and George R. Douglas, Jr.

[57] ABSTRACT

To eliminate undesired interference between tracks of signals recorded on a magnetic recording medium by a multitrack magnetic recording device having adjacent heads spaced apart by predetermined distances, the marginal edge portions of the signal tracks are erased by erase heads. These are located in fixed positions relative to the record heads so that after recording, the signal tracks travel past the erase heads to remove said marginal portions. To ensure that the erasing effect is limited to the marginal edge portions each erase head is surrounded, except for the actual erasing area, by a non-magnetic medium.

9 Claims, 2 Drawing Figures

MAGNETIC RECORDING APPARATUS WITH EDGE ERASE MEMBERS WHICH ERASE AREA BETWEEN TRACKS

This invention relates to magnetic recording apparatus and is more particularly concerned with multitrack apparatus.

BACKGROUND OF THE INVENTION

Data recording apparatus, as commonly employed with data processing systems, provides for magnetically recording data on an appropriate medium such as a magnetic tape or disc. With magnetic tape recording devices, it has been found that the amount of information which may be recorded over a particular length of tape can be substantially increased by recording in a plurality of tracks on the tape. Thus, by having say eight tracks on a tape, the amount of data which may be recorded is substantially increased over single track tapes. However, unless the recording heads of a multihead device are accurately spaced apart and the tape is carefully aligned with the heads, signals applied to one head may seriously interfere with the operation of adjacent heads. For example, a "write" signal applied to one recording head will cause that head to produce fringe magnetic fields which, under certain circumstances may be coupled erroneously as noise signals to an adjacent track of the tape. In this way it is possible to "write" on a portion of the tape where it is intended that no information should be written.

In order to overcome the above problem, it has been proposed to prevent fringe magnetic fields of one head from being coupled to a track on the tape corresponding to an adjacent head. One approach to this problem includes an erase head positioned between adjacent recording heads such that the tape, when moving, passes over the recording heads before the erase heads. A problem with this approach is that the erase heads must be carefully constructed so as not to erase information previously "written" by the recording heads.

SUMMARY OF THE INVENTION

According to the invention, there is provided apparatus for erasing portions of signals recorded on a magnetic recording medium including a pole piece with at least two spaced apertures each containing a signal erase member which is magnetically isolated from the surrounding pole piece, and a magnetic system for producing a magnetic field at each erase member, such that on passing the signal between an adjacent pair of erase members only the portions of the signals passing over the erase members are erased.

BRIEF DESCRIPTION OF THE DRAWING

Magnetic recording and erasing apparatus embodying the present invention will now be described, by way of example, with reference to the accompanying drawing, in which.

DESCRIPTION OF PREFERRED EMBODIMENT

Figure 1:
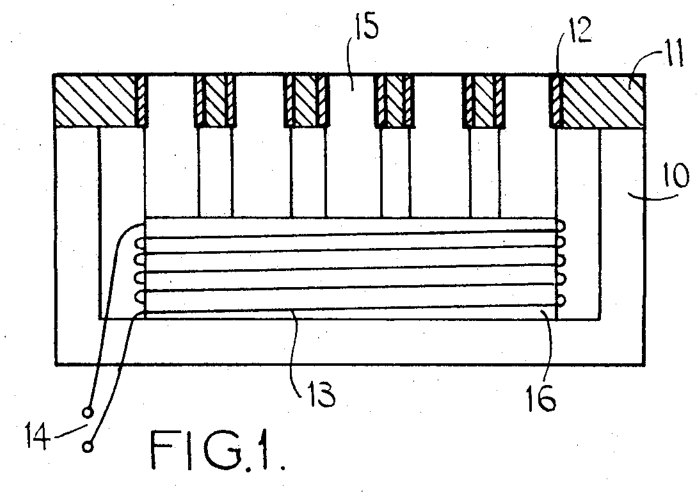
FIG. 1 shows a sectional schematic view of a device for erasing portions of recorded magnetic signals.
Figure 2:
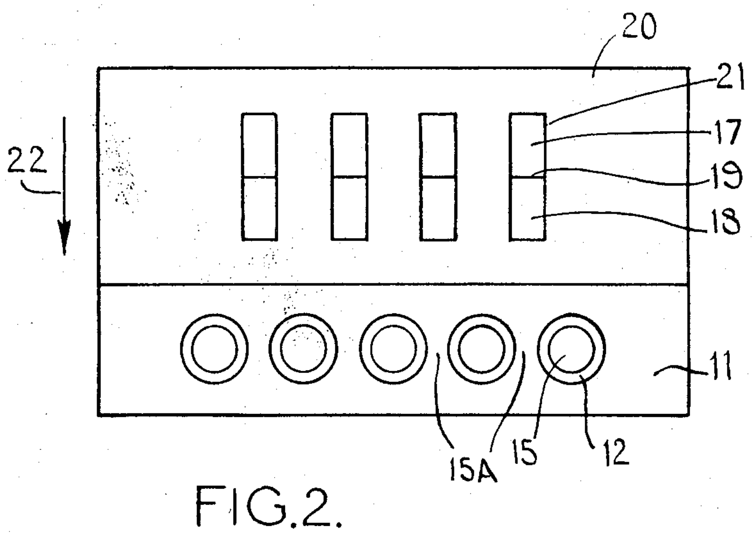
FIG. 2 shows a plan view of a magnetic recording and erasing apparatus.

Referring now to FIG. 1, there is shown a member 10 comprised of a magnetic material which provides a low reluctance path for a magnetic field from common pole piece 11 to core 16. Common pole piece 11 has a number of apertures therein, the number being determined by the number of erasing heads which are required. The number of erasing heads is, in turn, determined by the number of recording heads 21 (FIG. 2.). Each erasing head is comprised of a pin 15, of magnetizable material, which material may be ferro-magnetic. The pins 15 are substantially cylindrical in shape and are inserted into corresponding apertures of common pole piece 11. The portion of each pin 15 which is inserted in pole piece 11 is surrounded by a non-magnetic material 12, such as copper, to separate each pin 15 from the common pole piece 11. Material 12 which may be an electrical insulator is shown in a tubular or ring configuration, and serves to centralize the pin in the circular hole.

A coil 13 is wound around core 16 and upon energization of coil 13, say by the application of a D.C. potential to input terminals 14, pins 15 are magnetized. The magnetic field 15 is substantially contained within the area defined by ring 12 although a fringe field will exist at the top edge of pin 15 and the common pole piece 11 and some lines of flux will pass through ring 12. The rings 12 define gaps 15A through which the non-erased portions of the signal tracks pass.

Referring now to FIG. 2, there is shown a plan view of a recording and erasing assembly incorporating the present invention. As noted previously, common pole piece 11 has pins 15, each surrounded by a ring 12, inserted therein. The recording device includes a base or support member 20 which has a number of magnetic heads 21, supported thereon, four such heads being shown. Each head 21 is separate from each adjacent head by a constant, predetermined distance. Also, each head may, for example, be comprised of magnetizable members 17 and 18 which are separated by a gap 19. Suitable means for magnetizing member 17 and 18 (not shown) are provided to allow recording on a magnetic recording member (not shown) which is moved in the direction of arrow 22. The diameter of each ring 12 is arranged to be slightly larger than the distance between adjacent heads 21 by an amount related to the tolerances of the tape guidance system.

In operation, as a magnetic recording medium, such as a magnetic tape, is moved relative to heads 21 in the direction of arrow 22, signals will be recorded in areas on the tape in the conventional manner. However, as a result of fringe fields being produced by heads 21, areas of the tape corresponding to the spaces between heads 21 will have spurious signals recorded thereon. In order to prevent the spurious signals produced by one head 21 from affecting areas of the tape corresponding to adjacent recording heads, a " tunnel erase " technique is employed. Thus, during recording by heads 21, coil 13 is energized to magnetize pins 15. The magnetic fields produced by pins 15 will "clean up" the edges of the recorded signals by reversing those portions of the recorded signals which pass over pins 15, whilst leaving the portions of the signals passing through the gaps 15A. Since, as has been seen in practice, cylinder 12 is effective to provide well defined limits to the erasing magnetic fields produced by pins 15 and coil 13, spurious signals which have been recorded on the tape are substantially erased.

While the present invention is not limited by any particular dimensions, the width of each recording head may be 0.040 inches while pins 15 and cylinders 12 may be positioned so that as much as 0.010 inches is erased from each edge of the recording head. By leaving a signal recorded on the tape with a width of 0.020 inches the tape may subsequently be read by head 21 even though the tape is as much as 0.010 inches out of alignment. In this manner, the tunnel erase feature of the present invention improves the tolerances which exist when aligning the tape with heads 21.

It will be appreciated that while a portion, say 0.010 inches, of each edge of the recorded signal will be erased, as described previously, any spurious signals recorded on portions of the tape corresponding to the spaces between heads 21 will also be erased. As a result of pins 15, then, the magnetic field produced by one of heads 21 will have a negilible effect on adjacent heads when the tape is being read.

Also, while magnetic heads 21 have been referred to as recording heads, it will be appreciated that such heads may just as well be "read/write" heads in practice. Similarly, although an erasing magnetic field has been described as that produced by the magnetization of ferromagnetic pins 15, such fields may be produced by permanent magnetic materials inserted in common pole piece 11. In such a case, a ring 12 is placed to surround each such material in a manner similar to the construction shown in FIG. 1.

I claim:

1. Apparatus for recording a plurality of signal tracks on a moving record medium including a multi-track magnetic recording device having a plurality of recording heads arranged to record said signal tracks in spaced apart side-by-side relation; and a signal erase device having a row of signal erase members arranged downstream of said recording heads with respect to the direction of movement of the record medium, each intermediate erase member of the row being positioned so as to erase an entire area of the record member between two neighboring tracks together with an adjacent edge portion of each of said neighboring tracks.

2. Apparatus as claimed in claim 1 in which said signal erase device includes a pole piece having a row of spaced apart apertures, and in which said signal erase members project one into each of said apertures, the apertures being larger than said erase members so that each member is spaced from the edges of its respective aperture to define a continuous non-magnetic gap therebetween; and means for producing a magnetic field across said non-magnetic gap.

3. Apparatus as claimed in claim 2 in which each of said signal erase members includes a permanent magnet.

4. Apparatus as claimed in claim 2 including a spacer positioned in each of said non-magnetic gaps.

5. Apparatus as claimed in claim 4 in which said spacer is formed from an insulating material.

6. Apparatus as claimed in claim 4 in which said spacer is formed from a non-magnetic electrically conductive material.

7. Apparatus as claimed in claim 4 in which each erase member includes a pin of magnetizable material and said spacer is a copper ring.

8. Apparatus as claimed in claim 4 in which the means for producing a magnetic field across the non-magnetic gaps includes a common core structure magnetically coupled to the pole-piece and to the erase members.

9. Apparatus as claimed in claim 8 including a coil mounted on the core structure; and means for electrically energizing the coil to magnetize the core structure.

* * * * *